Nov. 18, 1952     B. M. HYMAN     2,618,113
REMOTE-CONTROL RELEASE OF SNAPPING ROLLS
Filed Sept. 23, 1948     2 SHEETS—SHEET 1
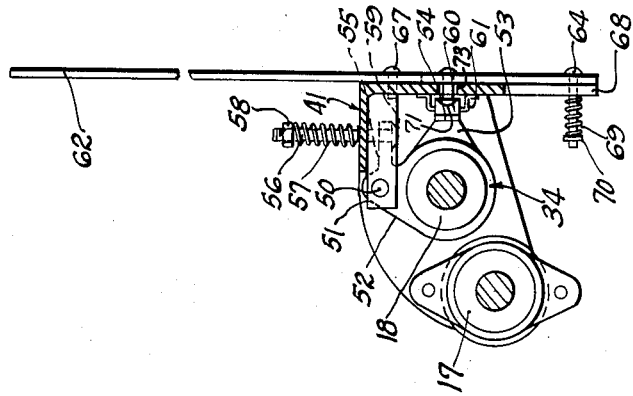
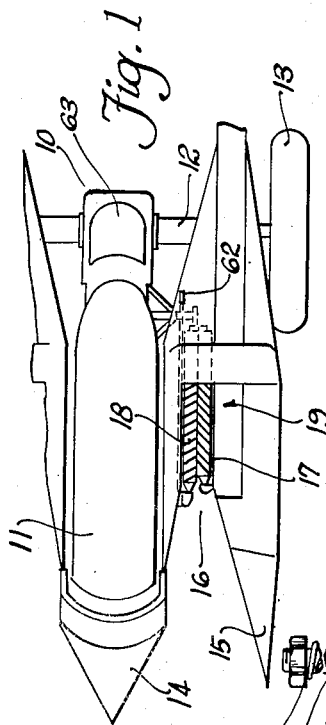
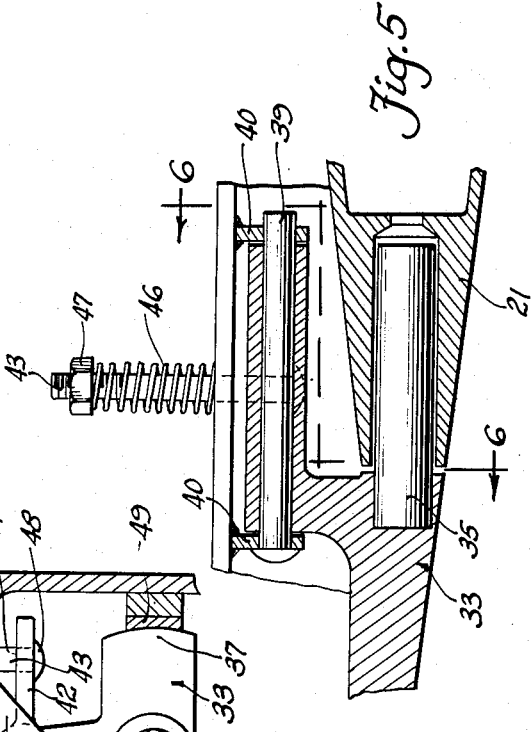
Inventor
Benjamin M. Hyman
By Paul O. Pippel
Atty Nov. 18, 1952  B. M. HYMAN  2,618,113
REMOTE-CONTROL RELEASE OF SNAPPING ROLLS
Filed Sept. 23, 1948  2 SHEETS—SHEET 2
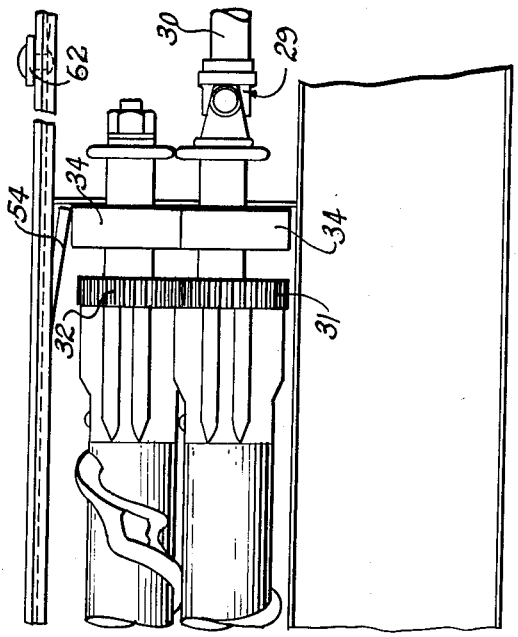
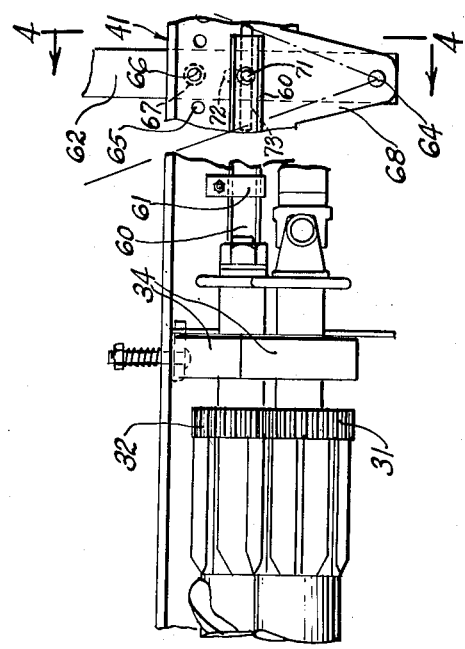
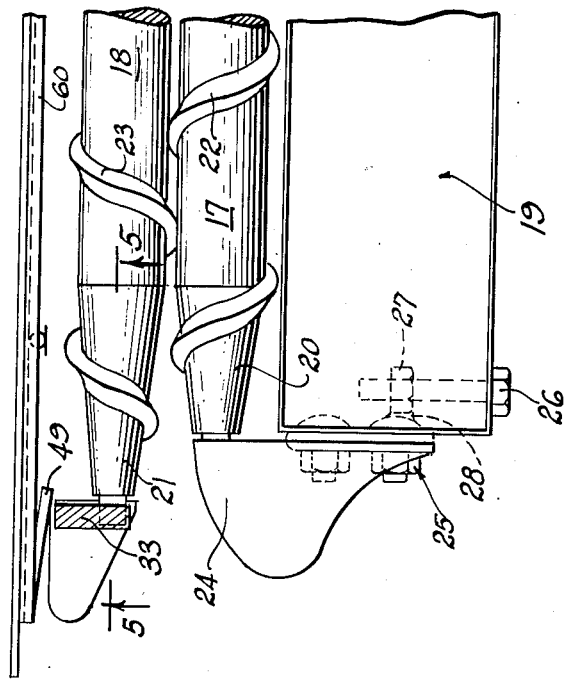
Fig. 2
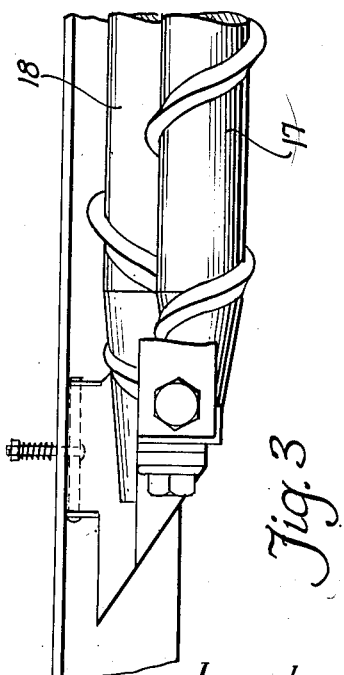
Fig. 3
Inventor.
Benjamin M. Hyman
by Paul A. Pippel
Atty Patented Nov. 18, 1952

2,618,113

UNITED STATES PATENT OFFICE 2,618,113

REMOTE-CONTROL RELEASE OF SNAPPING ROLLS

Benjamin M. Hyman, Moline, Ill., assignor to International Harvester Company, a corporation of New Jersey Application September 23, 1948, Serial No. 50,741

3 Claims. (Cl. 56—104)

1

This invention relates to a new and improved remote control release for corn picking snapping rolls.

Corn pickers of the past have been equipped with snapping rolls having fixed spacing. This spacing was determined by test and was usually based on the success of picking an ordinary or average field of corn. The snapping rolls so set would effectively operate to pick and snap corn throughout all normal conditions, but in the event of an abnormal situation the snapping rolls would be unable to handle the corn stalks and the machine would jam. These abnormal situations might take the form of stalks blown over by a storm or the like or it may perhaps be the grouping of an unusually large number of stalks within a short space. In either event a heavy load would be imposed on the rolls. Even in an average stand of corn these abnormal conditions might and usually do occur many times.

When snapping rolls are jammed with stalks in progress therethrough the job of the operator is to pull these stalks back out through the cooperative snapping rolls and thus clear the way for them to resume normal turning operations. Nothing is more difficult than to pull stalks rearwardly from a clenched position between jammed rolls when the rolls are stationary. In view of this difficulty the operator instead of turning the snapping rolls off, leaves the power engaged to make it easier for him to pull the caught stalks out from between the rolls. In this way just as soon as certain of the pressure is relieved the rolls will start rotating and the machine will clear itself. This involves considerable danger to the operator's hands and arms and very often the operator's hands are caught between the rolls when the rolls resume feeding rotation.

It will be seen that there are two factors entering into the undesirableness of jammed snapping rolls of corn pickers. The first is the danger involved to the operator in attempting to relieve the congestion in the machine. The second is the loss of time in effecting a clean-out of the snapping rolls.

Recently corn pickers have been provided with snapping rolls that have had their spacing adjustable upon the loosening of several bolts and thereafter a manual shifting of the roll to a new position. Access to the bolts has been exceedingly difficult. Further, after the bolts have been loosened, it has been impossible to determine which way to move the rolls or what spacing the rolls originally possessed. Under such

2 circumstances, the rolls may have to be adjusted or an attempt must be made to adjust the rolls many times before the picker functions as desired. This is a tedious job and very uncertain. The uncertainty becomes more aggravating as the operator might adjust the rolls in the wrong direction or not enough in the other direction and therefore might not only cause jamming of the rolls but may also produce an undesirable sample of corn harvested.

A principal object of the present invention is to provide means for easily and conveniently separating the snapping rolls of a corn picker and thereby permit the machine to clear itself at any time after jamming.

An important object of this invention is the provision of remote control means for increasing the spacing between cooperative snapping rolls in a corn picker.

Another important object of this invention is to provide means for spacing cooperative snapping rolls in infinitely varied positions.

A further important object is to supply in a corn picking machine a remote control release mechanism for the snapping rolls to prevent serious jamming of the snapping rolls and to provide continuous uninterrupted operation of the corn picker throughout an entire field of corn.

Another and still further important object of this invention is to provide control means adjacent the operator of a corn picker for effecting a change in spacing between the cooperative snapping rolls of the corn picker.

A still further important object of this invention is the provision of means associated with one of a pair of cooperative snapping rolls for hinging that roll for arcuate movement toward and away from the other cooperative roll and remotely operated cam means for causing arcuate swinging of the one roll about its hinge to thus vary the space between the rolls and permit easy cleaning out thereof.

Other and further important objects of this invention will become apparent from the disclosures in the following specification and accompanying drawings in which:

Fig. 1 is a top plan view of a tractor-mounted corn picker incorporating the principles of this invention.

Fig. 2 is a fragmentary enlarged top plan view of the corn picker snapping rolls as shown in Fig. 1.

Fig. 3 is a fragmentary side elevational view of the device as shown in Fig. 2.

Fig. 4 is a fragmentary end view of Fig. 3 as viewed on the line 4—4.

Fig. 5 is an enlarged sectional view taken on the line 5—5 of Fig. 2.

Fig. 6 is a sectional view taken on the line 6—6 of Fig. 5.

As shown in the drawings, the reference numeral 10 indicates generally a tractor having a longitudinally extending body 11, a transversely extending rear axle structure 12, and widely spaced rear traction wheels 13. A corn picker having spaced gathering points 14 and 15 is mounted on the tractor between the long narrow body 11 and one of the traction wheels 13. The gatheing points 14 and 15 are adapted to guide the standing corn into a throat portion 16, the rearward end of which contains cooperative snapping rolls 17 and 18 adapted to grasp the stalk, pulling the stalk down therebetween to the point of attachment of the ear of corn and thereupon to snap the ear from the stalk. The corn picker includes a support or frame work 19 adapted to carry the snapping rolls for rotation. The snapping rolls are cylindrical throughout the major portion of their length and have tapered forward points 20 and 21 respectively. A spiral rib 22 and 23 is wound along the length of each of the rolls 17 and 18 and acts to move the stalks rearwardly between the rolls and also to more aggressively snap the ears of corn from the stalk.

The forward end of the roll 17 is journalled in a member 24 which is in turn bolted at 25 to the frame or support 19. An adjustable screw 26 is arranged and constructed on the support 19 for fixing the lateral adjustment of the roll 17. In order to effect movement of the roll 17 by the screw 26 the bolt members 25 are loosened and thereupon the screw 26 is rotated, causing the nut 27, which is welded to the bolt 25 at 28, to be pulled toward or away from the outer side of the support 19. This in turn effects lateral shifting of the bearing member 24 and thus also the forward end of the roll 17. A universal joint 29 is provided in the drive shaft 30 leading to the snapping roll 17 at the upper end thereof and thus permits shifting of the forward end of the roll without materially affecting or changing the drive to the rolls. Each of the rolls is provided with spur gears 31 and 32 which are in cooperative engagement, thereby transmitting drive from the roll 17 to the roll 18 in an opposite direction. The adustment shown at 25 and 26 is relatively standard and does not form part of the invention. The spacings between the rolls 17 and 18 are preset by this adjustment at 25—26 and thereafter the rolls cooperate with that spacing for picking and snapping standing stalks of corn throughout all ordinary operation thereof.

The roll 18 is provided with bearing members 33 for the forward end of the roll and 34 for the rearward end of the roll. The bearing 33 is shown in detail in Fig. 6. A stub shaft 35 projecting from the forward tapered end 21 of the roll 18 is journaled within the sleeve-like member 36 of the bearing 33. This bearing unit 33 is provided with a laterally extending arm or projection 37 and an upwardly extending arm 38 hingedly mounted at 39 on a bracket 40 depending from an angle member 41, forming a part of the support 19. Another laterally extending arm 42 is substantially parallel to the arm 37 and forms an integral part with an upper end of the arm 38. A vertically disposed pin 43 passes through alined apertures 44 and 45 in the arm 42 and angle member 41 respectively. A spring 46 is positioned around the shank of the pin 43 extending above the angle member 41 and exerts an upward force against a collar 47 integrally fastened to the pin 43. The pin is provided with a head 48 engaging the underside of the arm 42 and thus the spring 46 urges the pin and thus the arm 42 upwardly. The bearing unit 33 being pivoted about the hinge 39 on the depending bracket 40 is caused to swing about the hinge 39 and moves the arm or projection 37 toward a cam member 49. The spring therefore yieldably maintains the bearing unit 33 of the roll 18 normally against the cam 49.

The bearing 34 at the upper end of the roll 18 is similarly hinged at 50 on a depending bracket 51 from the angle member 41. The bearing unit 34 is provided with an upwardly extending arm 52 to effect the hinging at 50 and a laterally extending arm 53 to engage a cam member 54. A second laterally extending arm 55 is substantially parallel to the arm 53 and by means of a structure similar to that for the lower end of the roll a vertically disposed bolt or pin 56 passes through alined apertures in the arm 55 and top surface of the angle member 41 to act as a guide and transmitter of the force of a spring 57 wound about the pin 56 and exerting an upward force against an adjustable collar 58 to thereby impart an upward force on the head 59 of the pin 56. It is apparent, therefore, that the projection or arm 53 of the bearing unit 34 is normally in engagement with the cam 54.

A longitudinally extending bar or rod 60 is adapted to have sliding engagement within bracket clamp members 61 affixed to the side of the angle member 41. The cam members 49 and 54 form an integral part of this rod 60. The cam members 49 and 54 as best shown in Fig. 2 are parallel one to the other and are inclined at some angle with respect to the carrying rod 60. Longitudinal movement of the rod 60 effects an abutting of the bearing members 33 and 34 by the cam members 49 and 54 respectively and thus the roll 18, through its bearing members 33 and 34, may be pushed toward the cooperative snapping roll 17 by downward movement of the bar 60, whereas an upward movement of the bar will permit the bearing units 33 and 34 to follow the receding cam members by action of the springs 46 and 57 respectively.

The rod 60 is moved longitudinally by a lever arm 62 located adjacent the driver's seat 63 of the tractor. The lever 62, as best shown in Fig. 3, is pivoted on a pin 64 carried in a downward extension 68 of the angle member 41 and may be moved forwardly or rearwardly to effect change in spacing between the cooperative snapping rolls 17 and 18. Spring 69 is positioned around the pin 64 between a collar 70 and the downward extension 68, thus making the lever hinge mounting yieldable. The lever 62 is joined to the rod 60 by means to effect longitudinal movement of the rod when the lever is swung in an arcuate path. A pin 71 is fixedly mounted in the rod 60 and projects through a vertically elongated slot 72 in the lever 62. The elongation of the slot 72 permits swinging of the lever 62 without binding. The bracket 41 is provided with an elongated horizontally disposed opening 73 through which the pin 71 may freely move to impart movement from the lever 62 to the rod 60. A series of holes 65 in the downwardly depending side of the angle member 41 and placed in an arcuate path permit locking of the hand lever 62 in any one of numerous inclined positions. The holes are preferably calibrated to give predetermined roll spacing. The lever 62 is similarly provided with a hole or aperture 66 for alinement with any one of the series of holes 65. A pin or the like 67 may then be inserted through the alined holes 65—66 and the lever 62 locked with respect to the angle member 41.

In operation the corn picker is driven through a field of standing corn in such a manner that the stalks are guided into the snapping rolls and in the event the stalks create too big a load or become too congested within the rolls, the operator need only move the hand lever 62 permitting the springs 46 and 57 to swing the roll 18 away from the cooperative roll 17, providing additional space between the rolls and permitting the rolls to clear themselves of their overload. In order to resume efficient corn snapping, the operator merely moves the lever 62 back to its starting position. It will thus be seen that the remotely stationed operator can clear his corn picker of any jamming without stopping the forward progress of the machine or without getting off the machine. It should be understood that this remotely operable snapping roll spacing means may be equally well applied to a pull behind corn picker and thus it is not intended to limit the patent to a tractor-mounted corn picker illustrated in the drawings.

Numerous details of construction may be varied throughout a wide range without departing from the principles disclosed herein and I therefore do not propose limiting the patent granted hereon otherwise than as necessitated by the appended claims.

What is claimed is:

1. A device for regulating the spacing between corn snapping rolls in a corn picker having a supporting structure and a pair of cooperative rolls mounted thereon, at least one of said rolls having carrying arms hingedly mounted on said support so the longitudinal axis of the roll may swing in an arc toward and away from the other of said cooperative rolls, comprising a longitudinally extending operator member lying parallel to said cooperative rolls and arranged on said supporting structure for longitudinal sliding movement, spaced cam members on said operator member, said cam members arranged and constructed to engage said hinged roll and effect varied swinging movement thereof toward and away from said cooperative roll.

2. In a corn picker construction having a support, cooperative snapping rolls, bearings for the ends of each of said rolls, arms affixed to the bearings of one of said rolls, said arms being in parallel relationship and hingedly mounted on said support in a manner to permit swinging of the roll on its longitudinal axis about the hinge arms, an elongated operating member journaled on said support for longitudinal sliding movement parallel to and adjacent the hinged roll, and cam means positioned on said operating member and arranged and constructed to engage the bearings of said hinged roll, whereby sliding movement of the operating member provides more or less engagement of the bearings by the cam and thus a greater or less swinging adjustment movement of the hinged roll toward or away from the cooperative roll.

3. A device as set forth in claim 2 in which the hinged roll has spring means arranged and constructed to normally urge said hinged roll to a position away from said cooperative roll whereby movement of the elongated operating member causes the cams to move the hinged roll toward its cooperative roll against the action of the spring means.

BENJAMIN M. HYMAN.

REFERENCES CITED

The following references are of record in the file of this patent:

UNITED STATES PATENTS

| Number | Name | Date |
| --- | --- | --- |
| 40,243 | Chase | Oct. 13, 1863 |
| 118,984 | Thorp | Sept. 12, 1871 |
| 370,097 | Stevens | Sept. 20, 1887 |
| 1,311,352 | Jones | July 29, 1919 |
| 1,641,436 | Jett | Sept. 6, 1927 |
| 1,853,176 | Paradise et al. | Apr. 12, 1932 |
| 1,945,364 | Coultas | Jan. 30, 1934 |